July 25, 1944. J. W. WILKINSON 2,354,238
OIL FILTER
Filed Aug. 9, 1941 3 Sheets-Sheet 1
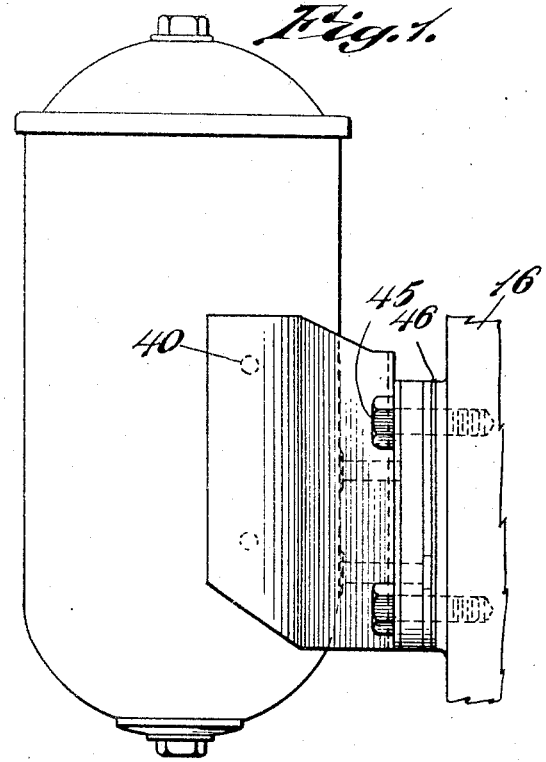
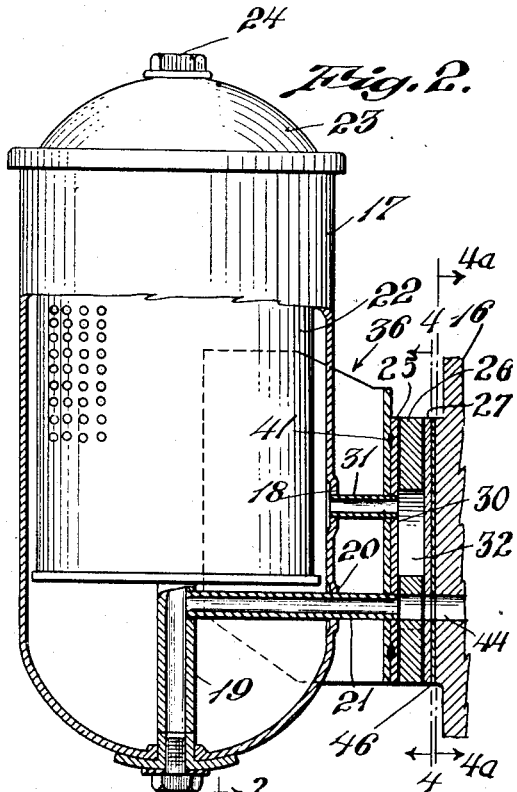
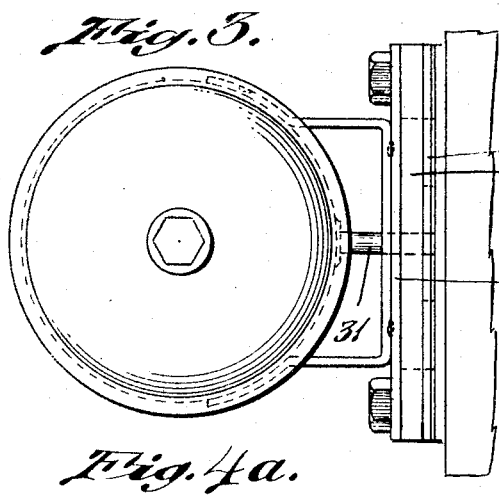
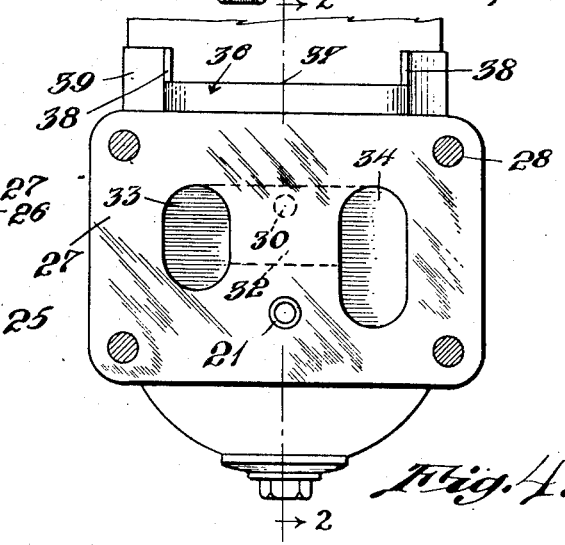
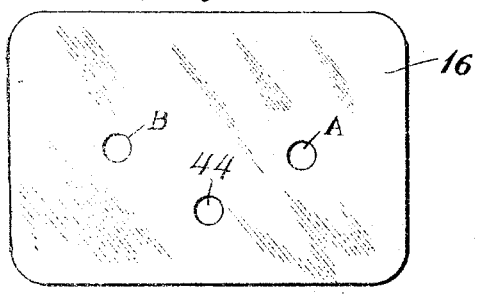
INVENTOR
James W. Wilkinson
BY Barlow & Barlow
ATTORNEYS

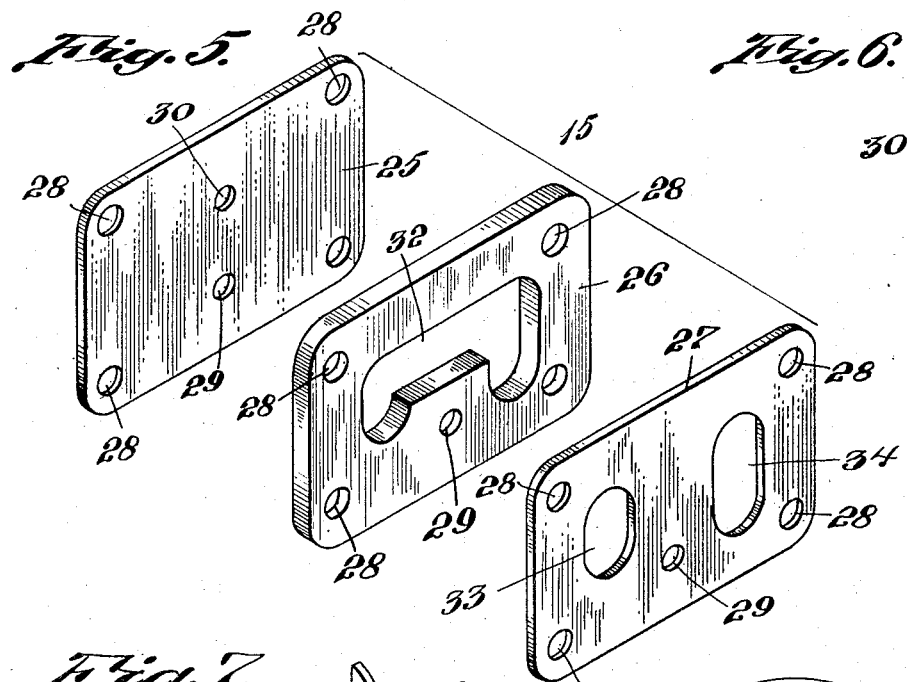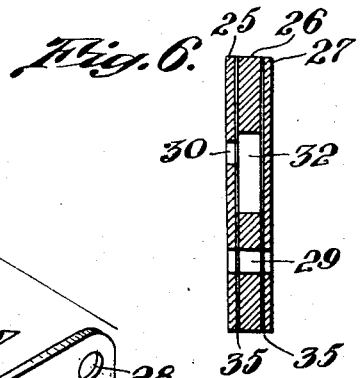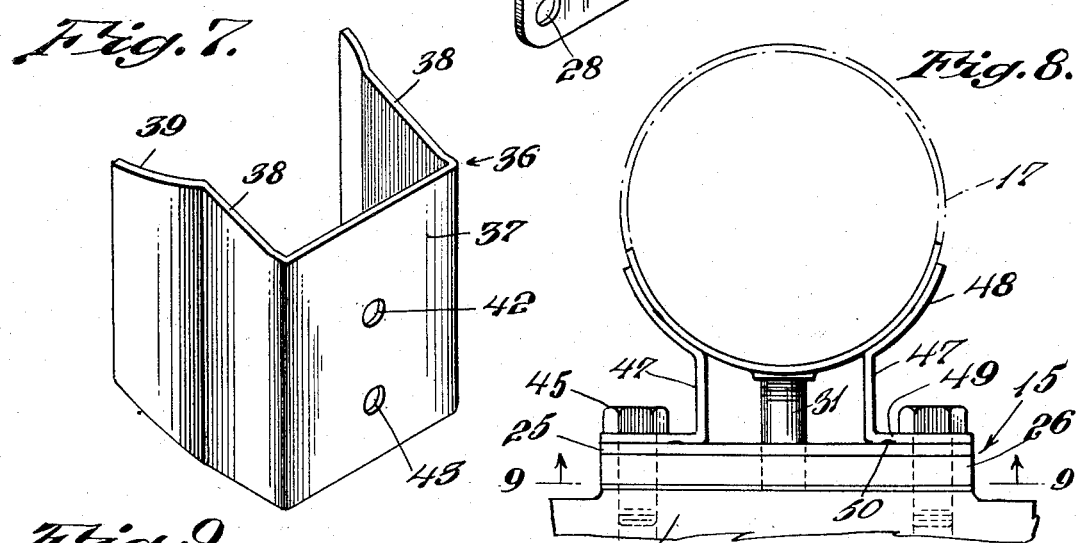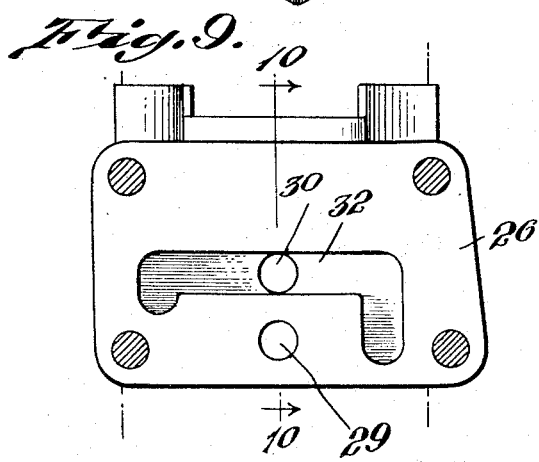

July 25, 1944.  J. W. WILKINSON  2,354,238
OIL FILTER
Filed Aug. 9, 1941   3 Sheets-Sheet 3
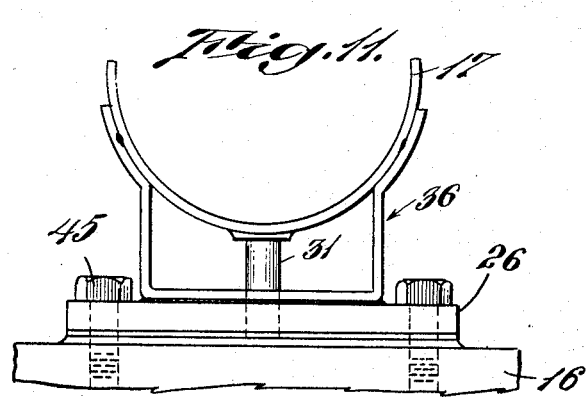
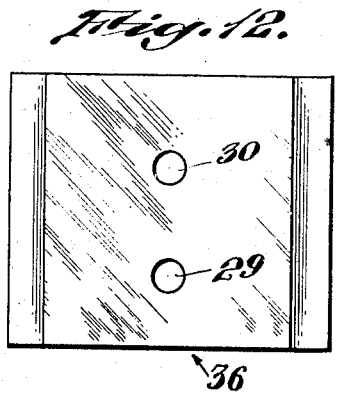
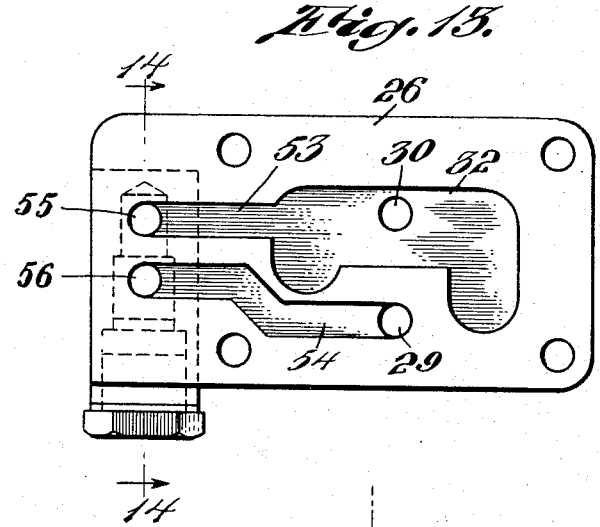
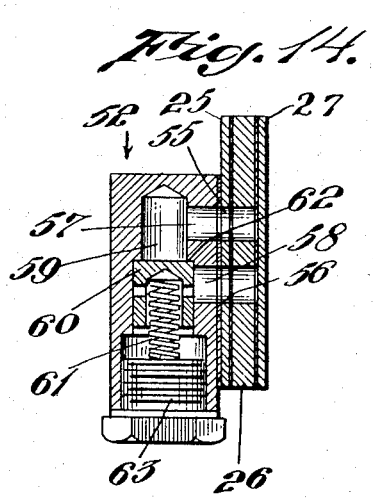
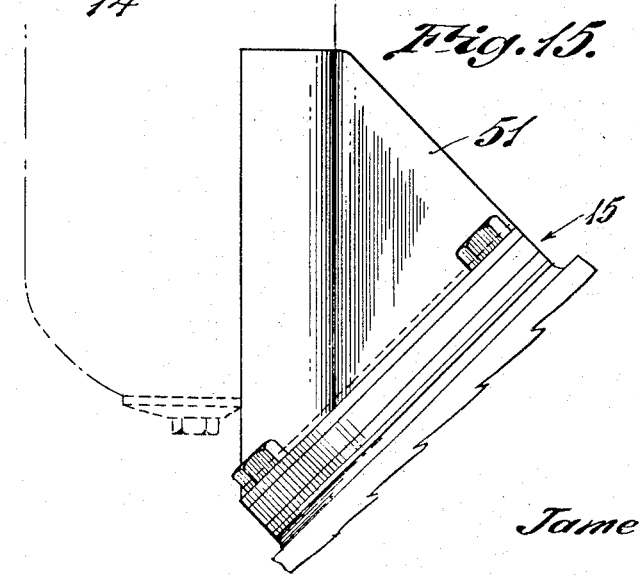
INVENTOR
James W. Wilkinson
BY Barlow & Barlow
ATTORNEYS Patented July 25, 1944

2,354,238

UNITED STATES PATENT OFFICE 2,354,238

OIL FILTER

James W. Wilkinson, Ann Arbor, Mich., assignor to Fram Corporation, a corporation of Rhode Island Application August 9, 1941, Serial No. 406,149

4 Claims. (Cl. 184—6)

This invention relates to an oil filter of the type which is mounted upon the engine as distinguished from the type mounted upon the dash or at some point from which conduits of extended length are provided for conveying the oil to and from the filter.

In the engine-mounted type of filter, it is usual to bolt some relatively heavy cast base to the engine and superimpose upon this base a casing containing the filter material, requiring a joint to be formed at such connection, which is broken each time a replacement cartridge or the like is positioned in the filter casing. The base is usually cored and drilled and secured to the engine block with cap screws or studs with a joint formed by some suitable soft packing or gasket between the base and the engine. A definite limit is provided for the relationship between the filter casing and the base so mounted, and a large amount of machine work is required in such a mounting.

An object of this invention is to eliminate many of the undesirable features of the heavy cast base utilized for the engine-mounted type of filter.

Another object of the invention is to provide a filter assembly which will be relatively light in weight.

More specifically, an object of the invention is to provide a filter which may be formed from relatively light pressed steel parts rather than utilizing a casting.

Another object of the invention is to provide a filter unit and base complete with permanent connections maintainable against vibration which frequently loosens detachable connections sufficient to cause a leak to occur at such detachable connection.

Another object of the invention is to provide an arrangement of the parts which from a manufacturing standpoint may provide all of the parts without tool changes and to be assembled in different arrangements to adapt the structure to different conditions.

Another object of the invention is to provide for a variation of one of the several parts of the assembly to provide a substantially different arrangement of the filter mounting.

With these and other objects in view, the invention consists of certain novel features of construction as will be more fully described, and particularly pointed out in the appended claims.

In the accompanying drawings:

Fig. 1 is a side elevation of a fragmental portion of an engine with the filter mounted thereon;

Fig. 2 is a view on line 2—2 of Fig. 4 of the same structure, partially in section;

Fig. 3 is a top plan view of the structure shown in Fig. 1;

Fig. 4 is a fragmental view looking substantially on the line 4—4 of Fig. 2;

Fig. 4a is a view on line 4a—4a looking in the direction of the arrows at the ground face of the casing;

Fig. 5 is an exploded view of the pad construction utilized in the filter mounting of Figs. 1–4;

Fig. 6 is a sectional view through the pad construction of Fig. 5 when the same is in assembled position;

Fig. 7 is a perspective view of the bracket;

Fig. 8 is a top plan view of a portion of the engine block with a modified form of pad and bracket construction and illustrating in dotted line the position of the filter in relation to the bracket;

Fig. 9 is a view looking on line 9—9 of Fig. 8;

Fig. 10 is a section on line 10—10 of Fig. 9;

Fig. 11 is a top plan view illustrating a fragmental portion of the engine block and a modification of a still different arrangement of pad with the bracket connected thereto and a fragmental showing of a filter casing;

Fig. 12 is a view looking at the face of the bracket of Fig. 11;

Fig. 13 is a modified view showing part of the pad equipped with a by-pass valve;

Fig. 14 is a section on line 14—14 of Fig. 13; and

Fig. 15 is a side elevation of a modified bracket for connecting the pad to the filter casing.

In proceeding with this invention, instead of using a cast base which is cored and drilled, I provide a pressed-metal pad made of two or more parts, assembled by brazing or the like, which will have holes registering with openings in the engine block for communication with the lubricating oil in the engine. I provide a standard filter casing, also of pressed steel construction; and by use of some suitable bracket secure the casing to the pad. Some connections are provided from the inflow and outflow openings of the filter casing to holes in the pad which communicate with the pressure and return for the lubricating oil. The entire assembly of casing, bracket and pad may be permanent and permanently mounted upon the engine block. Access to the filter material is provided through a cover upon the filter casing without necessity of breaking any joints between the casing and its mounting or its attachment to the engine block.

With more detailed reference to the drawings the portion of the engine upon which the filter is mounted is designated 16 and has a ground face with openings in this portion for the conduction of oil in the lubricating system of the engine. The openings consist of a pressure conduit A and two separate return conduits 44 and B. The filter which is to be utilized for cleaning the lubricating oil of the engine consists of a casing 17 of some known form, usually of a pressed metal shell having an inlet or inflow opening 18 along the side wall of the casing and a center tube 19 which is part of the discharge flow line from the casing and is connected through the outflow opening 20 in the casing shell by some conduit such as 21. The filter is in by-pass relation to the usual pressure circulation system of the engine. A filter cartridge 22 is located within the casing and is positioned between the inflow opening and outflow opening of the casing so that the by-passed oil will pass through this cartridge to have foreign particles in the oil removed therefrom. A cover 23 is suitably secured at the upper end of the casing 17 and is removable by detachment of the bolt 24 for replacement of cartridge 22 when the same has accumulated a sufficient amount of foreign material from the oil.

To mount such a standard form of filter as above described, I provide a pad construction and permanently connect it to the casing 17 with conduits leading from the pad 15 to the inflow and outflow openings of the casing also of a permanent nature. This pad may take various forms dependent on the engine with which the filter is to be associated, but is provided with openings so that it communicates with the oil line usually adjacent the circulating pump for picking up oil in a by-pass relation to the system to transfer it to the filter, and then through a different hole in the same pad the oil is discharged to the crank case or conduit on the inflow or low pressure side of the pump. The pad construction which I have here illustrated in Figs. 1 to 7 is adapted for a "Buda" engine. Other arrangements I have shown for other engines also in the other figures.

Fig. 5 illustrates a pad 15 formed of three plates, there being an outer plate 25, the intermediate or oil flow plate 26, and a sealing-off or inner plate 27. These plates are formed of pressed steel with openings therein as illustrated more clearly in Fig. 5. Each of these plates has the four openings 28 in its four corners registering for the passage of the cap screws 45 or studs for securing the pad to the engine block. The plates also each have an opening 29 registering to provide a conduit to the opening 44 which leads to the crank case or low pressure side of the lubricating system and to which opening is connected the conduit 21. The plate 25 is provided with an opening 30 for connection to the inflow side of the filter such, for instance, as by means of the conduit 31 (see Fig. 2). This opening 30 communicates with a pressure oil flow passage provided by cutting out the plate 26 as at 32 in the shape there shown. This shape serves at either of its ends to register with the openings 33 and 34 formed in the plate 27 which openings are in turn so positioned or located as to register with openings A and B in the ground face of the engine block. Opening A being the pressure opening and B the return the cut out 32 forms a by-pass conduit in the system. The contacting surfaces of these plates are ground so that they will form a good tight joint. The three plates 25, 26 and 27 are secured together by brazing or soldering such, for instance, as in a hydrogen furnace by material such as 35 positioned between the plates. The material which is used for brazing of these plates is known to run only along the contacting surfaces and does not obscure the openings which are provided in these plates and which register as above pointed out. Thus, the lubricating oil in the engine for which this particular arrangement is designed passes through the opening A, then 33 and through the channel or passage provided by the opening 32 and back into the engine through the opening 34 and conduit B, establishing a by-pass where this lubricant is under pressure which communicates with the opening 30 which opening 30 in the plate 25 forms a pick-up for oil from the by-pass flow line thus established in the lubricating system of the engine.

A bracket designated generally 36 and shown in perspective in Fig. 7 is provided in some suitable shape dependent on the position the casing is to assume relative to the engine and has a bridge portion 37 with legs 38 extending therefrom. These legs at their end portions are shaped as at 39 to fit snugly about the filter casing 17 where they are welded such as by spot welding 40 (see Fig. 1). The bridge portion 37 is spot welded as at 41 (see Fig. 2) to the outer plate 25, and this bracket is provided with openings 42 to register with the opening 30 and an opening 43 to register with opening 29 in the plate 25. The pad consisting of these three plates is thus permanently fixed by means of this bracket with relation to the casing 17, while the conduit tubes 31 and 21 are welded or otherwise permanently secured to the casing and through the openings 42 and 43 in the bracket and are permanently connected at their other end to the pad.

In this manner, oil flowing from the gallery or by-pass channel 32 will be picked up through the opening 30, conduit 31, pass into the filter, and return through conduit 21 to opening 29 extending through all the plates to the hole or opening 44 in the engine base 16 and to the crank case or low pressure side of the system. Bolts 45 may pass through openings 28 in the pad for securing the assembly to the engine base 16 and some gasket or soft packing as 46 may be utilized for forming a tight joint at this point.

In Fig. 8, the plate 27 of the pad heretofore described is omitted, as in this instance the outside surface of the engine base will serve the same function as would the wall of the plate 27 between the openings 33 and 34, and it is merely necessary for me to provide a plate 26 with a channel 32 (see Fig. 9) while utilizing also the plate 25 constructed as heretofore described in connection with Fig. 5. These two plates will be brazed together as at 35 previously referred to, while the openings 29 and 30 are also provided and connected as heretofore.

I have, however, illustrated a little different form of bracket in Fig. 8 in that I have utilized two leg portions 47 arched as at 48 to receive the casing 17, while their opposite ends are turned outwardly away from each other as at 49 and are welded as at 50 to the outer plate 25 of pad 15. Thus, in this instance, the bridge portion of the bracket such as 37 in Fig. 7 is absent and the conduits 31 and 21 extend directly into the plate 25 where they are permanently secured as heretofore mentioned.

In Figs. 11 and 12, I have illustrated a casing having a bracket 36 as heretofore provided; but in this case, I have provided only the plate 26 as the bridge portion of the bracket serves as 25, the same being welded or brazed to the bracket; and in this case the openings 29 in this bridge and plate will register directly with opening 44 in the engine base. The openings 30 with the flow line from the pressure side of the lubricating system will pick up lubricant from the by-pass 32.

It will be realized that various types of brackets may be utilized for permanently relating the pressed metal casing and the pressed pads so that the oil filter may take various positions with reference to the engine base. Two types of brackets have been shown in Figs. 7 and 8, while a third bracket designated 51 is illustrated in Fig. 15, and here the casing is positioned higher on the bracket, illustrating the variety of arrangements adaptable. The inflow and outflow connections to the casing may be variously arranged, and that which I have shown is merely a most direct form in the particular arrangement.

It may be at times desirable to provide a by-pass in the pad if the filter is connected directly in the circulating system and this can very easily be accomplished by connection of the oil flow channel or gallery to the return conduit in this pad and control the connection by a valve. In this case there will be but one return conduit on the ground face, namely opening 44. In Figs. 13 and 14, I have illustrated an arrangement by which such a by-pass may be had. The intermediate oil flow channel plate 26 is extended in length to the left, as shown in Fig. 13, and the by-pass valve designated generally 52 is mounted on the pad at the outer side of the outer plate 25, and suitable channels are cut in the pad plates for connection thereto. From the oil flow channel 32 a channel 53 is cut to the left, as shown in Fig. 13, while from the return opening 29 a return channel 54 is cut in the plate 26. These channels at their ends will register with openings 55 and 56 in the plate 25 (see Fig. 14) and in turn register with conduits 57 and 58 in the by-pass valve 52. Openings 57 and 58 are connected by a conduit 59 which is controlled by a valve 60 held against seat 62 in the conduit by a spring 61 which may be adjusted by means of cup nut 63. If pressure should become excessive due to clogging of the filter, the oil may by-pass by this valve, compressing the spring 61, and pass into the low pressure side of the system through the conduits 55, 57, 59, 58, 56, 54 and 29 without circulating through the filter.

I claim:

1. In combination, an engine having a casing with a ground face and a pair of conduits of the lubricating system of the engine having a pair of terminal openings in said ground face, a filter comprising a casing containing a filtering medium and having a wall with inflow and outflow openings providing another pair of terminal openings, said pairs of terminal openings being so related that at least one of the openings of one pair is out of alignment with one of the openings of the other pair when presented one pair to the other, a rigid middle plate member between said ground face and wall provided with an opening through the thickness thereof to register with one terminal opening in said ground face and one terminal opening in said wall and provided with another opening through the thickness thereof of elongated shape having one portion thereof extending to the other opening in said ground face and another portion thereof extending to the other opening in said wall whereby to cause communication between the out of alignment pairs of terminal openings in the face and wall.

2. In combination, an engine having a casing with a ground face and a pair of conduits of the lubricating system of the engine having a pair of terminal openings in said ground face, a filter comprising a casing containing a filtering medium and having a wall with inflow and outflow openings providing another pair of terminal openings, said pairs of terminal openings being so related that at least one of the openings of one pair is out of alignment with one of the openings of the other pair when presented one pair to the other, a laminated means for mounting said filter on said ground face comprising a pair of companion rigid pressed plate members in face to face contact, one member having a pair of passages extending through the thickness thereof to register with one pair of said terminal openings and the other member provided with opening extending through the thickness thereof to register with one opening in said member and one opening of the other pair of terminal openings and another opening of elongated shape through the thickness thereof having a portion thereof extending to the other opening in the first said member and another portion thereof extending to the other of said terminal openings whereby to connect said out of alignment openings.

3. In combination, an engine having a casing with a ground face and a pair of conduits of the lubricating system of the engine having a pair of terminal openings in said ground face, a filter comprising a casing containing a filtering medium and having a wall with inflow and outflow openings providing another pair of terminal openings, said pairs of terminal openings being so related that at least one of the openings of one pair is out of alignment with one of the openings of the other pair when presented one pair to the other, a laminated means for mounting said filter on said ground face comprising companion rigid pressed plate members in face to face contact, there being members each having a pair of passages extending through the thickness thereof to register with each pair of said terminal openings and a third member located between and provided with an opening extending through the thickness thereof to register with one opening in one member and one opening of the other member and another opening of elongated shape through the thickness thereof having different portions thereof extending to the other openings in the two first said members whereby to connect the out of alignment openings of each of said pairs of terminal openings.

4. In combination, an engine having a casing with a finished surface on a portion thereof, a pressure flow conduit and a return flow conduit of the lubricating system of the engine opening into said finished surface, a filter comprising a casing containing a filtering medium and having a wall with an inflow and outflow set of openings, a pair of rigid plate members together having a passage to connect the said pressure flow conduit to the inflow conduit and another passage to connect the outflow passage of the filter with said return flow conduit, said plate members together with said finished surface providing a pair of conduits extending from said plate passages, means including a passageway connecting said conduits to provide a by-pass and a valve to control said passageway.

JAMES W. WILKINSON.